(12) United States Patent
Stark et al.

(10) Patent No.: US 9,071,545 B2
(45) Date of Patent: Jun. 30, 2015

(54) NETWORK APPLIANCE THAT DETERMINES WHAT PROCESSOR TO SEND A FUTURE PACKET TO BASED ON A PREDICTED FUTURE ARRIVAL TIME

(71) Applicants: Gavin J. Stark, Cambridge (GB); Nicolaas J. Viljoen, Cambridge (GB); Niel Viljoen, Cambridge (GB); Rolf Neugebauer, Cambridge (GB)

(72) Inventors: Gavin J. Stark, Cambridge (GB); Nicolaas J. Viljoen, Cambridge (GB); Niel Viljoen, Cambridge (GB); Rolf Neugebauer, Cambridge (GB)

(73) Assignee: NETRONOME SYSTEMS, INCORPORATED, Santa Clara, CA (US)

( * ) Notice: Subject to any disclaimer, the term of this patent is extended or adjusted under 35 U.S.C. 154(b) by 320 days.

(21) Appl. No.: 13/668,251

(22) Filed: Nov. 3, 2012

(65) Prior Publication Data

US 2014/0126367 A1 May 8, 2014

(51) Int. Cl.
*H04L 12/861* (2013.01)
*H04L 12/725* (2013.01)
*H04L 12/851* (2013.01)
*H04L 12/26* (2006.01)

(52) U.S. Cl.
CPC .............. *H04L 45/30* (2013.01); *H04L 47/245* (2013.01); *H04L 43/0852* (2013.01)

(58) Field of Classification Search
CPC ...... H04L 47/10; H04L 27/24; H04L 47/2441; H04L 47/245; H04L 47/2475; H04L 47/2483; G06F 9/3845; G06F 9/3885
See application file for complete search history.

(56) References Cited

U.S. PATENT DOCUMENTS

2011/0213869 A1\* 9/2011 Korsunsky et al. ........... 709/223
2012/0124196 A1\* 5/2012 Brisebois et al. ............. 709/224

\* cited by examiner

*Primary Examiner* — Curtis A Alia
(74) *Attorney, Agent, or Firm* — Imperium Patent Works; T. Lester Wallace; Mark D. Marrello

(57) ABSTRACT

A network appliance includes a network processor and several processing units. Packets a flow pair are received onto the network appliance. Without performing deep packet inspection on any packet of the flow pair, the network processor analyzes the flows, estimates therefrom the application protocol used, and determines a predicted future time when the next packet will likely be received. The network processor determines to send the next packet to a selected one of the processing units based in part on the predicted future time. In some cases, the network processor causes a cache of the selected processing unit to be preloaded shortly before the predicted future time. When the next packet is actually received, the packet is directed to the selected processing unit. In this way, packets are directed to processing units within the network appliance based on predicted future packet arrival times without the use of deep packet inspection.

19 Claims, 5 Drawing Sheets

EXEMPLARY SYSTEM INVOLVING A
NETWORK APPLIANCE

DATA CACHE ENTRY

FLOW STATE CACHE ENTRY

NETWORK APPLIANCE THAT DETERMINES WHAT PROCESSOR TO SEND A FUTURE PACKET TO BASED ON A PREDICTED FUTURE ARRIVAL TIME

TECHNICAL FIELD

The described embodiments relate generally to network appliances that communicate flows of packets.

BACKGROUND INFORMATION

There are several types of network appliances that communicate flows of packets. In one example, the network appliance is a switch or router through which a plurality of client network devices interconnect to the Internet. A great many different flows, which may be as many as one million flows, may pass through such a network appliance. In order to be able to direct packets of these many flows in various ways within the network appliance in an efficient manner, the network appliance must generally determine the application protocol type of the packets of each flow. Accordingly, the network appliance performs deep packet inspection on a packet of each flow and thereby determines various things about the flow, including the application protocol type of the flow. Performing this deep packet inspection is slow and may limit the performance of the network appliance, but knowing the application protocol type is often necessary in order to otherwise optimize performance of the network appliance.

SUMMARY

A network appliance includes a flow processor and a plurality of processing units. A processing unit may, for example, be a processor integrated circuit that has a CPU (Central Processing Unit) and cache memory. Alternatively, a processing unit may be several integrated circuits that together include a processor and associated cache memory. Regardless of how the processing unit is realized, packets of numerous flows pass through the network appliance. For example, a flow pair may involve a first flow of packets and a second flow of packets. The first flow passes from a first network device, to the network appliance, through the network appliance, and to a second network device. The second flow passes in the opposite direction from the second network device, to the network appliance, through the network appliance, and to the first network device. The layer 4 protocol of the packets of the two flows is TCP (Transmission Control Protocol) and the two flows together realize a TCP connection between the first network device and the second network device. There are many such flow pairs, the packets of which pass through the network appliance on their ways between various network devices. The network appliance may simply route the packets, or the network appliance may route the packets and perform other functions. The network appliance may perform metering, monitoring, policing, and other functions.

The flow processor monitors packets of a flow pair and determines a predicted future time when the next packet of the flow pair will be received onto the network appliance. The flow processor makes this determination without performing any deep packet inspection on any of the packets of the flow pair. The flow processor makes this determination without inspecting an application type field in any application layer header of any packet of the flow pair. When the future packet is later received onto the network appliance, the flow processor directs the future packet to a selected one of the processing units. Which one of the processing units it is that the future packet is directed to is based at least in part on the predicted future time. After the future packet is processed by the selected processing unit, the packet passes back to the flow processor and passes out of the network appliance. In one example, the determination of which processing unit to send a future packet to involves factors in addition to the predicted future arrival time of the next packet, and there are multiple different rules for determining the selected processing unit to which the future packet will be directed.

In one example, the future packet is classified into one of several classes. For example, if the future packet is determined to be in class 1, then the packet is sent to a predetermined processing unit where this processing unit is used to process all other packets of the flow, both before and after the future packet. The flow is said to be "pinned" to this processing unit. If the future packet is determined to be in class 2, then the future packet is sent to the processing unit to which the last packet of the flow was sent. If the future packet is determined to be in class 3, then the processing unit to which the future packet will be sent is selected from a pool of available processing units, where the selection is based on factors including the predicted future arrival time of the future packet. Data is needed to process the future packet. This data should be present in cache in order for the CPU of the processing unit to be able to use the data in the processing of the future packet. If the cache of the processing unit is preloaded too early, then the preloaded data may be overwritten by the time the future packet actually arrives. Accordingly, after a waiting period, but prior to the arrival time of the future packet, the flow processor causes the data cache of the selected processing unit to be preloaded with data that the processing unit then later uses to process the future packet when the future packet arrives. By not preloading the cache too early, the overwriting of the preloaded data in the cache is avoided. If the future packet is determined to be in class 4, then the processing unit to which the future packet will be sent is also selected from a pool of available processing units, where the selection is based on factors including the predicted future arrival time. In the event of a class 4 classification of the future packet, however, the flow processor does not endeavor to initiate preloading of the cache of the selected processing unit.

Although the method of determining what processing unit to send a future packet to and the method of preloading initiation described above are based on a predicted future arrival time of a packet of a flow pair of a TCP connection, the layer 4 protocol of the packet being directed need not be TCP but rather may be another protocol. Although the method of determining what processing unit to send a future packet to and the method of preloading initiation described above involve monitoring packets of a flow pair to determine the predicted future arrival time of a future packet, the methods also apply to monitoring packets of a single flow and based thereon predicting a future packet arrival time of a packet of that flow. The future packet prediction methods and techniques disclosed are broadly applicable and apply to determining a future packet arrival time based on monitoring packets of a flow pairs and to determining a future packet arrival time based on monitoring packets of single flows. The described methods of determining of what processing unit to send a future packet to based on a predicted future arrival time are not limited to a printed circuit board level architecture involving a flow processor integrated circuit and separate processor integrated circuits, but rather the methods are also applicable to other architectures such as integrated circuit level architectures where the flow processor and the processing units are co-located on the same integrated circuit.

Further details and embodiments and techniques are described in the detailed description below. This summary does not purport to define the invention. The invention is defined by the claims

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
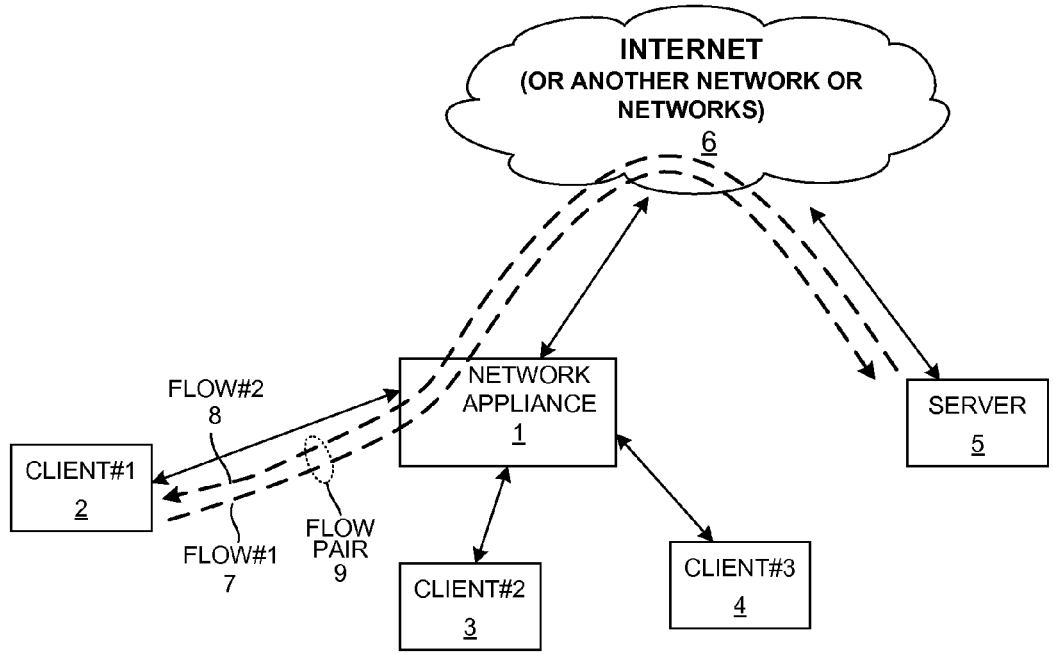
FIG. 1 is a simplified diagram of system employing a network appliance in accordance with one novel aspect.

FIG. 1 is a simplified diagram of a system employing a network appliance 1 in accordance with one novel aspect. Network appliance 1 is in network communication with numerous client network devices 2, 3 and 4 as well as with a server 5. Communication with the server 5 in the illustrated example is through a network or networks. In one example, the networks are the Internet 6 as illustrated in FIG. 1. The various clients 2-4 and the server 5 can communicate data back and forth between each other using the TCP/IP protocol suite. In the illustrated example, client 2 is in TCP/IP communication with server 5. Client 2 sends a first flow 7 of TCP/IP packets to server 5 through network appliance 1 and Internet 6. Server 5 sends a second flow 8 of TCP/IP packets to client 2 through Internet 6 and network appliance 1. The term "flow" as it is used here refers to a sequence of packets sent from a particular source (for example, identified by a TCP source port and IP source address) to a particular destination (for example, identified by a TCP destination port and IP source address) that the source desires to label as a flow. A flow may consist of all packets in a specific transport connection, but it is not necessarily 1:1 mapped to a transport connection. The two flows 7 and 8 are referred to here as a "flow pair" 9 and form a TCP connection. The term TCP connection is used here in a general colloquial sense. In this particular example, the TCP connection is not terminated anywhere on network appliance 1, but rather packets are communicated back and forth between the client 2 and the server 5 via flows 7 and 8 to transfer data reliably between client 2 and server 5 using the TCP protocol.

Figure 2:
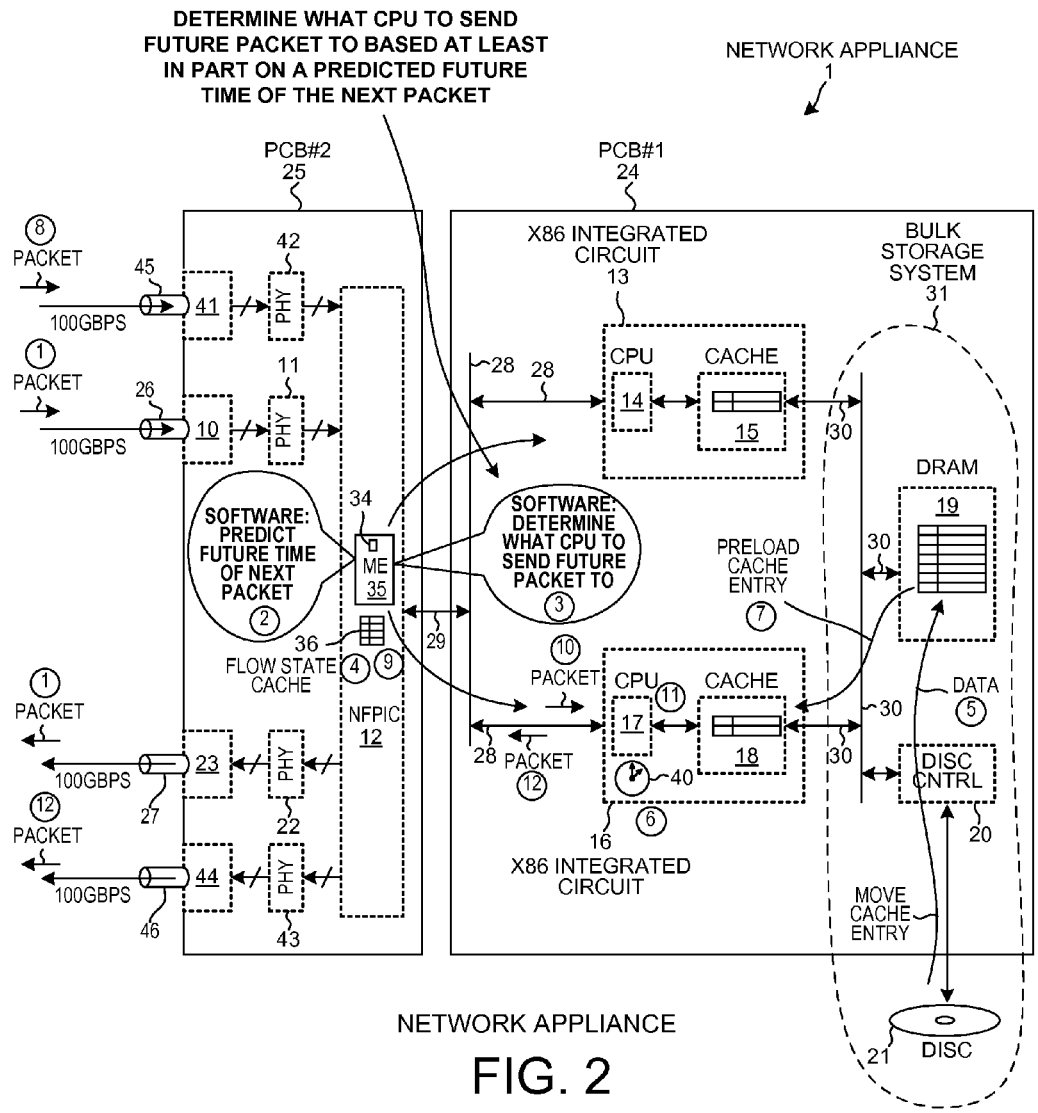
FIG. 2 is a diagram of the network appliance 1 of FIG. 1.
Figure 4A:
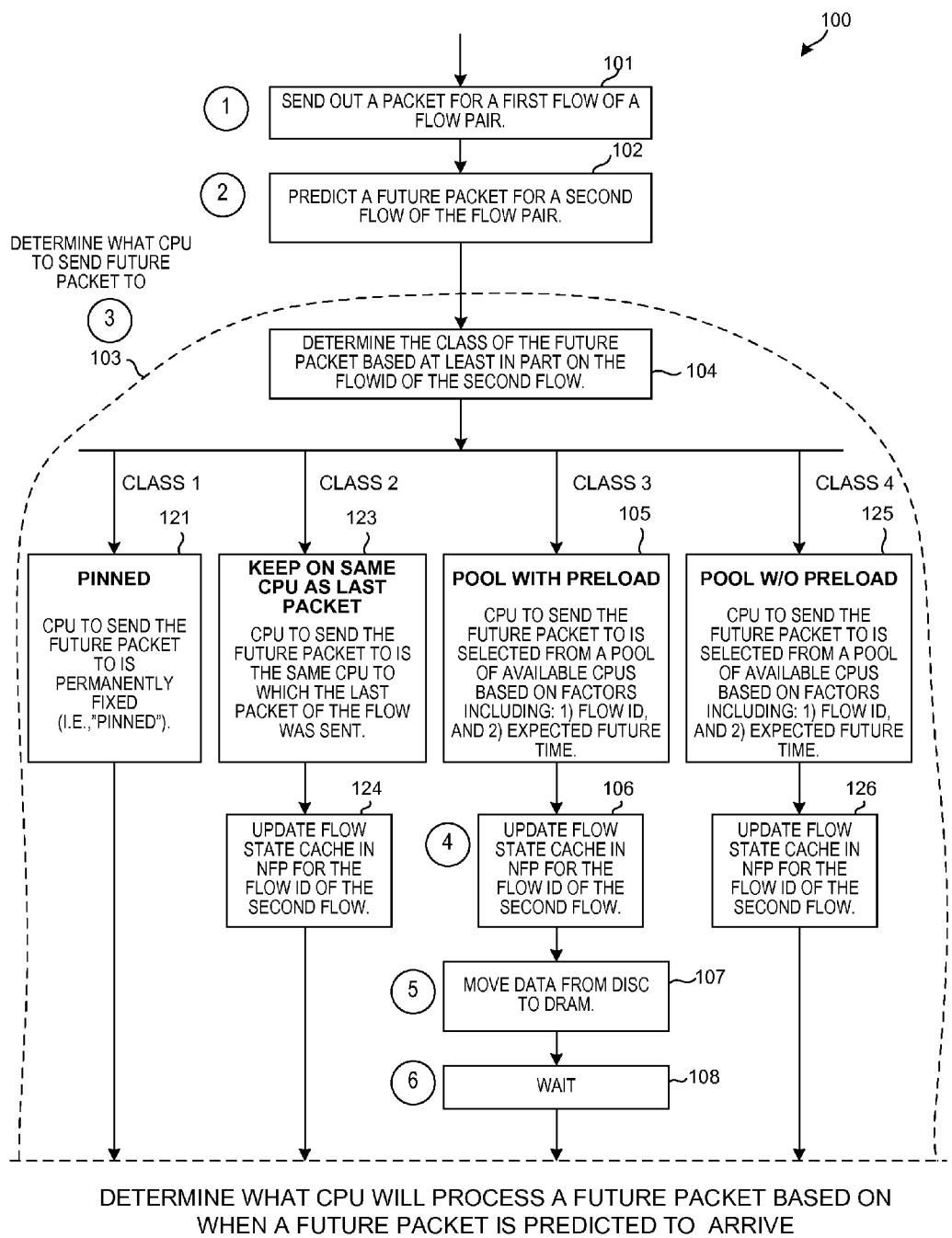
FIG. 4 includes FIG. 4A, FIG. 4B and FIG. 4C which together are a flowchart of a method of operation of the network appliance 1 of FIG. 1.
Figure 4B:
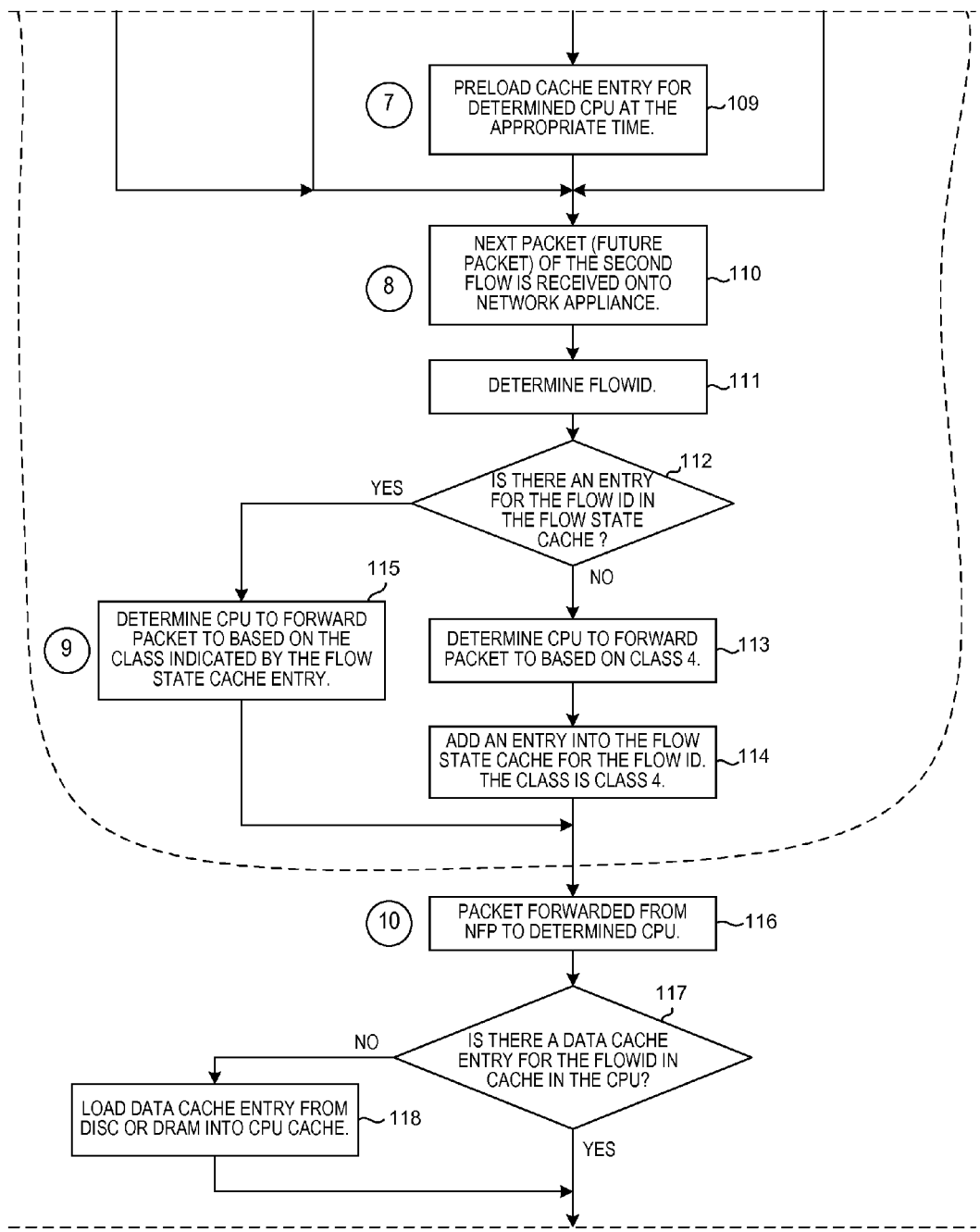
Figure 4C:
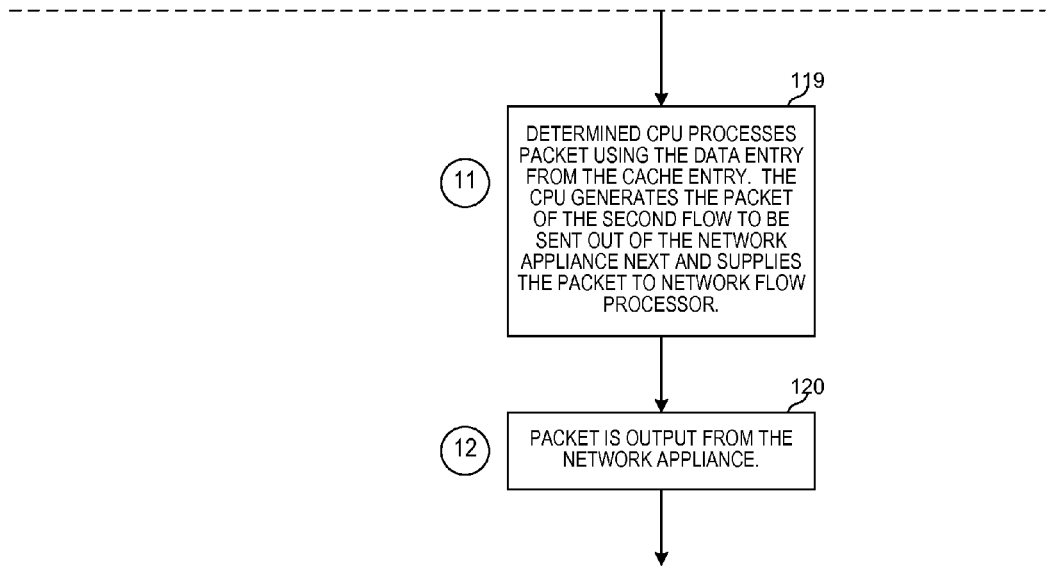
Figure 4C:
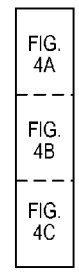

FIG. 2 is a simplified schematic diagram of network appliance 1. Network appliance 1 includes optical-to-electrical transceivers 10 and 41, a PHY integrated circuits 11 and 42, a flow processor integrated circuit 12, a first x86-architecture integrated circuit 13 having a CPU 14 and a cache memory 15, a second x86-architecture integrated circuit 16 having a CPU 17 and a cache memory 18, an amount of slower memory 19 such as an amount of Dynamic Random Access Memory (DRAM), a disc controller 20, a hard disc 21, PHY integrated circuits 22 and 43, and electrical-to-optical transceivers 23 and 44. CPUs 14 and 17 are specific cases of processing units. Components 13, 16, 19, and 20 are mounted to a first printed circuit board 24. Components 10, 11, 41, 42, 23, 22, 44, 43 and 12 are mounted to a second printed circuit board 25. The first and second printed circuit boards 24 and 25 are coupled together by a high speed connector 29.

Many different flows of packets come into network appliance 1 at rates of up to 100 Gbps over optical fibers 26 and 45. Many different flows of packets pass out of network appliance 1 at rates of up to 100 Gbps over optical fibers 27 and 46. Flow processor integrated circuit 12 is coupled to the first and second x86 integrated circuits 13 and 16 via connector 29 and bus mechanism 28. The first and second x86 integrated circuits 13 and 16 are coupled to DRAM 19 and to hard disc controller 20 via bus mechanism 30. In one example, flow processor integrated circuit 12 is an instance of the IB-NFP integrated circuit described in U.S. patent application Ser. No. 13/399,324, filed Feb. 17, 2012, titled "Configurable Mesh Data Bus In An Island-Based Network Flow Processor", by Gavin J. Stark (the entire subject matter of which is incorporated herein by reference). Slower DRAM 19, disc controller 20, hard disc 21 and bus mechanism 30 together form a bulk storage system 31. One type of information stored in bulk storage system 31 is data cache entries.

Figure 3:
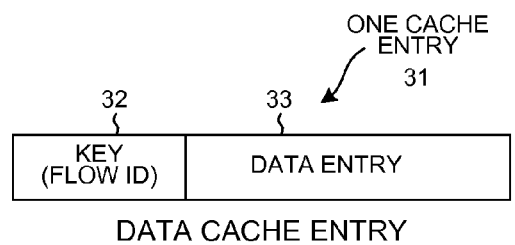
FIG. 3 is a diagram of a data cache entry of a cache of one of the processor integrated circuits of the network appliance 1 of FIG. 1.

FIG. 3 is a simplified diagram of one data cache entry 31 that is stored in bulk storage system 31. Data cache entry 31 includes a key portion 32 (a flow ID in this example) and a data entry value portion 33. One function of the CPUs 14 and 17 is to obtain a data cache entry stored in association with a particular flow ID. A CPU that receives a packet to process presents the key (flow ID) for the packet flow to its cache memory. If the cache memory contains a data cache entry whose key portion matches the flow ID presented, then the data cache entry in the cache memory is accessed and is returned to the CPU. The data cache entry includes information usable by the CPU to process the packet of the flow ID. In the present example, the packets of a flow all have the same TCP source port, TCP destination port, IP source address and destination IP address. A flow can be uniquely identified by this set of four values. Sometimes, information on the layer 4 protocol (such as TCP) is used as well. If, however, the CPU presents the flow ID to its cache memory but its cache memory does not contain a data cache entry whose key portion matches the flow ID presented, then the bulk storage system 31 looks for the data cache entry in DRAM 19 and/or on disc 21. The data cache entry having the key of the flow ID presented is read from the device where it is stored (either DRAM 19 or disc 21 in this example), the data cache entry is obtained, and the data cache entry is returned to the CPU. The data cache entry is also typically transferred into the cache memory of the requesting CPU so that if the CPU soon thereafter presents the same flowID for lookup the data cache entry for the flow ID will be in the CPU's cache memory. It is far more time consuming for the CPU to obtain a data cache entry from DRAM 19 or disc 21 than it is for the CPU to obtain the data cache entry from its cache memory. Caching techniques and methods for updating a CPU's cache memory with data cache entries are well known in the art.

FIG. 4 is a flowchart of a method 100 of operation of the network appliance 1 of FIG. 1. Packets of many different flows pass into the network appliance 1 via optical fibers 26 and 45 and pass out of the network appliance 1 via optical fibers 27 and 46. A packet prediction program 34 executes on a processor of microengine (ME) island 35 within Network Flow Processor Integrated Circuit (NFPIC) 12. The program is a set of processor-executable instructions that is stored in a processor-readable medium (memory) in the ME island. The processor of the ME island, under the control of the packet prediction program 34, reads and executes these instructions. Under software control, the processor causes the first initial packets of many flows to be monitored. Deep packet inspection is performed on a packet or packets of each flow pair to determine the application protocol of the flows of the flow pair. For the flow pair, for each packet number of a packet traveling in a given direction, the size of the packet is recorded and is logged into a table for the application protocol. There is one such application protocol count table generated for each application protocol. Such data obtained from many different flows is combined to generate the data application protocol count table. The data in the application protocol count table can be thought of as recording a size/sequence/direction signature of a flow pair of the corresponding application type. Information from these application protocol count tables are then combined to form a single application protocol estimation table. The application protocol estimation table contains indicia of a size/sequence/direction signature for each application protocol.

In addition to generating the application protocol estimation table, the packet prediction program 34 records and logs, for each application protocol type, the inter-packet intervals between successive packets of the flow pair. Many flow pairs of the same application protocol type are analyzed to generate the inter-packet interval data in the "inter-packet interval table" for an application protocol. Once this inter-packet interval data is collected, it is usable to predict a time interval between a last packet of a flow pair of a given application protocol type, and the next packet of the flow pair of the application protocol type. There is one such "inter-packet interval prediction table" for each application type.

In many cases the last packet of the flow pair was communicated between a client and a server in one direction, and the next future packet of the flow pair will be communicated in the opposite direction. In other cases, however, the last packet and the next future packet of the flow pair both are communicated in the same direction. The packets of thousands of flow pairs are monitored and analyzed in this way. Once the application protocol estimation table and the inter-packet interval prediction tables have been established in a "learning phase", the information in these tables is usable in an "operating phase" to analyze packets of a new flow pair and to detect the size/sequence/direction signature of the new flow pair and thereby to estimate the application protocol of the new flow pair. In addition, the information in the tables is usable to determine a predicted time interval between each successive pair of packets of the new flow pair.

In one example, after the "learning phase" has been completed, the first initial packets of a new flow pair are received onto the network appliance 1. Some packets of the new flow pair are received onto the network appliance from one network device via a first flow of the flow pair whereas others of the packets are received onto the network appliance from another network device via the second flow of the flow pair. For each packet received onto the network appliance, the network appliance uses the TCP source and destination ports of the packet and the IP source and destination addresses of the packet to identify the flow to which the packet belongs. The identified flow is assigned a flow ID or is matched up with a flow ID and the assigned flow ID is associated with a flow pair. As packets of the new flow pair are received onto network appliance 1, the sizes and directions and packet numbers of the initial packets are used in combination with the application protocol estimation table to determine the size/sequence/direction signature that best fits the initial packets of the new flow pair. The best fit identifies an estimated application protocol even though no deep packet inspection on any of the packets of the new flow pair was performed. Once the estimated application protocol for the flows of a flow pair has been determined, an indication of the estimated application protocol is stored in association with the flow IDs of each of the two flows. Based on the estimated application protocol type, the inter-packet interval prediction table for the estimated application protocol is consulted. The corresponding inter-packet interval prediction table indicates, for each packet number of each flow of the flow pair, the likely time interval between that packet and the next packet of the flow pair. Accordingly, the inter-packet interval prediction table is usable to determine a time interval between the last packet of the flow pair that was actually communicated (actually received onto the network appliance) and the next future packet of the flow pair that will be communicated in the future (that will be received onto the network appliance). As each successive packet of a flow pair is received onto the network appliance, the flow ID of the packet is determined, and from the flow ID the appropriate inter-packet interval prediction table is consulted. A time duration until the next future packet of the flow pair is then determined using: 1) the appropriate inter-packet interval table, 2) the packet number of the last packet, and 3) the direction of the last packet.

The method 100 of FIG. 4 begins with a first packet of flow 7 being received onto network appliance 1 from client 2 via optical fiber 26. This first packet passes through the network appliance and is then sent out (step 101) of network appliance 1 to server 5 via optical fiber 27. This first packet is denoted in FIG. 1 with the numeral "1" in a circle. Likewise the step 101 of receiving and sending this packet is denoted in FIG. 4 with the same numeral "1" in a circle. The packet prediction program 34 executing on flow processor 12 predicts (step 102) a future time when the next packet (i.e., a future packet) of the flow pair 9 will likely be received onto network appliance 1.

In the particular example of FIG. 4, the future packet of flow pair 9 is a packet of second flow 8 and will be received onto network appliance 1 from server 5 via optical fiber 45 on the packet's way to its destination on client 2. However, as described above, the next packet of the flow pair need not pass in this direction. In another example, the next packet (i.e., the future packet) of flow pair 9 is a packet of first flow 7 and the next packet will pass from client 2, through optical fiber 26, through network appliance 1, and to server 5 via optical fiber 27.

In the particular example of FIG. 4, flow processor 12 of the network appliance 1 determines (steps 103 of FIG. 4) a CPU to which the next packet of the flow pair will be sent. This determining is denoted with numeral "3" in a circle in FIG. 2 and in FIG. 4. Flow processor 12 does this by classifying (step 104) the future packet based at least in part on its flow ID. The flow processor 12 maintains a flow state cache 36. Flow state cache 36 is a table of many flow state cache entries.

Figure 5:
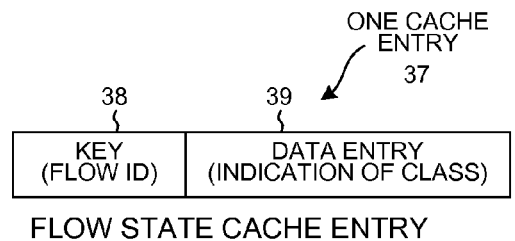
FIG. 5 is a diagram of a flow state cache entry of a flow state cache of the network processor of the network appliance 1 of FIG. 1.

FIG. 5 is a diagram of one flow state cache entry 37 of the flow state cache 36. Flow state cache entry 37 includes a key portion 38 (a flow ID portion) and a data entry portion 39 (a class identification portion). The flow state cache 36 is usable to lookup, for the flow ID of a packet, the class assigned to the flow ID. In the present example, a flow ID can be classified to be in one of four classes. In step 104 of FIG. 4, the flow ID of the future packet is determined, and the flow state cache 36 is consulted to find the flow state cache entry for the flow ID. If there is an entry in the flow state cache 36 for the flow ID of the second flow, then the determined class is the class indicated by the flow state cache entry. If there is no entry in the flow state cache 36 for the flow ID of the second flow, then the determined class is set to be the default value of "class 4".

In the illustrated example of FIG. 4, the flow state cache 36 contains an entry for the flow ID of the second flow. The flow state cache entry indicates "class 3". Processing proceeds to step 105. Class 3 is indicated to be "pool with preload". The CPU to send the future packet to is selected from a pool of available CPUs. Which CPU of the pool it is that is selected is based on factors including: 1) the flow ID, and 2) the expected future time when the future packet is predicted to arrive. If the predicted future time of the next packet is far off in the future, then CPU 17 is selected, otherwise CPU 14 is selected. In the illustrated example, CPU 17 is selected.

Next (step 106), the flow state cache entry for the flow ID may be updated or another flow state cache entry for another the flow ID may be written with a flow state entry for the second flow ID.

In the specific example of FIG. 4, flow processor 12 determines that the next packet for the flow pair will be processed by CPU 17. Flow processor 12 informs CPU 17 of the future time when the next packet is expected. This may be done by sending CPU 17 a future time value across bus mechanism 28. In response, CPU 17 prepares for receiving the packet by causing data to be moved from disc 21 to DRAM 19. This step of moving the data (step 107) is denoted in FIG. 2 and in FIG. 4 with the numeral "5" in a circle. This data may, for example, include a data cache entry for the flow ID of the predicted future packet.

The CPU 17 then waits (step 108) an amount of time until just shortly before the future time when the next packet is predicted to arrive. This waiting is denoted in FIG. 2 and in FIG. 4 with the numeral "6" in a circle and by the clock symbol 40.

Next, CPU 17 initiates preloading of the corresponding data cache entry for the flow ID (step 109) from DRAM 19 to data cache 18. The preloading is carried out such that the cache entry for the flow ID is present in data cache 18 before the predicted next packet is actually received onto network appliance 1. This step of preloading is denoted in FIG. 2 and in FIG. 4 with the numeral "7" in a circle.

The cache entry for the flow ID is not, however, preloaded into data cache 18 so far in advance that it would likely be overwritten by another cache entry ID. CPU 17 may process packets from a great many flows such that only a small proportion of the cache entries for the flows to be processed can be stored in data cache 18 at a given time. Accordingly, as CPU 17 processes packets a cache entry for a flow ID that was last accessed a relatively long time in the past may be overwritten with a cache entry for the flow ID of packets of a more recently handled flow. If the cache entry for the flow ID of the future packet were immediately preloaded into cache 18 at the time the future time prediction were made, then enough time may transpire between the time of preloading and the time when the predicted future packet would actually arrive that the preloaded cache entry in cache 18 would have been overwritten. This problem is avoided in the method of FIG. 4 by CPU 17 waiting (step 108) an amount of time until just before the future packet is predicted to arrive, and only then causing the cache entry to be preloaded.

In one example, network flow processor 12 actually initiates the preloading by providing to CPU 17 an "entry update time control value". The CPU 17 uses this "entry update time control value" to cause the cache to be preloaded at the time indicated by the entry update time control value. Alternatively, the network flow processor 12 initiates the preloading by providing the CPU 17 an indication of the predicted future time. Based on this information, CPU 17 determines when the preloading should occur and causes the preloading to occur. CPU 17 may, for example, cause the preloading to occur a predetermined amount of time before the indicated predicted future time. Regardless of how the network flow processor 12 initiates the preloading, the preloading occurs in good time before the future packet actually arrives and the preloading does not occur so early that the data cache entry is already overwritten when the CPU 17 needs the data cache entry in its cache to process the packet.

Next, the future packet for the flow pair is received (step 110) onto the network appliance 1 from server 5 via optical fiber 45. The arrival of this packet is denoted in FIG. 2 with the numeral "8" in a circle. The step 110 of receiving the future packet is denoted in the flowchart of FIG. 4 with the numeral "8" in a circle as well. The packet passes to flow processor 12. Flow processor 12 examines headers of the packet and determines the TCP source and destination ports and the IP source and destination addresses. From these TCP and IP header values, the flow processor 12 determines the flow ID (step 111) of the second flow. The flow state cache 36 is examined to determine (step 112) if there is a flow state entry in the cache 36 for the flow ID. If there is no flow state entry in flow state cache 36 for the flow ID, then the CPU to forward the packet to is determined based on the "class 4" rule (step 113) and an entry for the flow ID is added into the flow state cache (step 114). In the present example, there is an entry in flow state cache 36 for the flow ID. The class identifier portion of the entry indicates "class 3". Based on the "pool with preload" rule for class 3, the CPU to which the packet is to be forwarded is determined (step 115) to be CPU 17. The packet is therefore forwarded from the flow processor 12 to CPU 17 (step 116). The forwarding of the packet from the flow processor 12 to CPU 17 is denoted in FIGS. 2 and 4 with the numeral "10" in a circle.

The receiving CPU 17 is then to process the packet using data of a data cache entry for the flow ID of the packet. Because the data cache entry whose key is the flow ID was just preloaded into cache 18 as described above, cache memory 18 is determined (step 117) to contain the proper data cache entry for the flow ID. The cache memory 18 returns the data cache entry to CPU 17 without a cache miss. If, however, the data cache entry for the flow ID were not present in cache memory 18, then a cache miss would occur and time would be required for the data cache entry value to be loaded (step 118) from DRAM or disc 21 into cache memory 18. Regardless of how the data cache entry for the flow ID is placed into cache memory 18, CPU 17 then uses the data of the data cache entry to process (step 119) the packet. The using of the data cache entry to process the packet is denoted in FIGS. 2 and 4 with the numeral "11" in a circle.

The packet is then output (step 120) from network appliance 1 via optical fiber 46 to client 2. The outputting of the packet is denoted in FIGS. 2 and 4 with the numeral "12" is a circle. As explained above, the packet is a packet of flow 8 and passes from the network appliance 1 to client 2. TCP connections associated with these flows 7 and 8 are not terminated on the network appliance 1, but rather TCP/IP packets of the flow pair 9 pass through the network appliance 1.

If in step 104 the future packet had been classified to be in "class 1", then processing would have proceeded from step 104 to step 121. According to the forwarding rule for "class 1", the CPU that the flow processor 12 would have sent the future packet to would have been "pinned" to one CPU such that all packets of the flow would be forwarded to that same one CPU.

If in step 104 the future packet had been classified to be in "class 2", then processing would have proceeded from step 104 to steps 123 and 124. According to the forwarding rule for "class 2", the CPU that the flow processor 12 would have sent the future packet to would have been the same CPU that the flow processor 12 had sent the last packet of the same flow to.

If in step 104 the future packet had been classified to be in "class 4", then processing would have proceeded from step 104 to steps 125 and 126. According to the forwarding rule of "class 4", the CPU that the flow processor 12 would have sent the future packet to would have been selected from a pool of available CPUs based on factors including: 1) the flow ID, and 2) the expected future time when the future packet is predicted to arrive. The actual determination of the CPU to which the packet is sent is made at the time when the future packet is received.

Although the present invention has been described in connection with certain specific embodiments for instructional purposes, the present invention is not limited thereto. Although in the specific exemplary embodiment illustrated above the flow pairs are flows of a TCP connection, the layer 4 protocol of the flows of the flow pair need not be TCP but may be another protocol. A packet can be identified as belonging to a flow by inspection of a label or tag in the packet, rather than by inspection of TCP and IP source and destination ports and addresses. The method of determining what processing unit to send a future packet to based on a predicted future arrival time of the future packet is not limited to applications involving flow pairs, but rather the method applies equally well to predicting a future packet arrival time of a future packet of a single flow and then determining how to direct that future packet based on the predicted future arrival time. Although a network appliance is described above as an example of an apparatus that determines what processing unit to send a future packet to based on a predicted arrival time of the future packet, the description of a network appliance is just an example and the method is understood to be more broadly applicable to use in other type of devices and systems including distributed software systems. Accordingly, various modifications, adaptations, and combinations of various features of the described embodiments can be practiced without departing from the scope of the invention as set forth in the claims.

What is claimed is:

1. A network appliance for communicating packets of a flow pair, wherein the flow pair comprises a first flow of packets and a second flow of packets, and wherein the network appliance comprises:
  a plurality of processor integrated circuits; and a network processor that receives a packet of the first flow and without performing deep packet inspection on any packet of the flow pair determines a predicted future time when a future packet of the flow pair will be received, wherein the network processor determines to send the future packet to a selected one of the plurality of processor integrated circuits based at least in part on the predicted future time, wherein the future packet is a packet of the second flow, the network appliance further comprising:
  a bulk storage system coupled to each of the plurality of processor integrated circuits, wherein the bulk storage system stores data associated with the second flow, wherein the network processor initiates a preloading of the data from the bulk storage system to the selected one of the processor integrated circuits prior to the predicted future time when the future packet will be received and before the future packet is actually received onto the network appliance, and wherein the network processor initiates the preloading by waiting an amount of time and then initiating the preloading.

2. The network appliance of claim 1, wherein all the packets of the first flow have the same TCP source port, the same TCP destination port, the same IP source address and the same IP destination address, wherein all the packets of the second flow have the same TCP source port, the same TCP destination port, the same IP source address and the same IP destination address, wherein the packets of the first flow pass from a first network device, through the network appliance and to a second network device, and wherein the packets of the second flow pass from the second network device, through the network appliance, and to the first network device.

3. The network appliance of claim 1, wherein the network processor determines the predicted future time when the future packet will be received by: 1) detecting a signature of the flow pair, 2) using the signature to identify an inter-packet interval prediction table, and 3) using the inter-packet interval prediction table and a packet number to determine an inter-packet time interval.

4. The network appliance of claim 1, wherein the network processor determines the predicted future time when the future packet will be received without inspecting an application type field in any application layer header of any packet of the flow pair.

5. The network appliance of claim 1, wherein at least some of the plurality of processor integrated circuits are mounted on a first printed circuit board, wherein the network processor is mounted on a second printed circuit board, and wherein the first and second printed circuit boards are coupled to together via a connector.

6. The network appliance of claim 1, wherein the network processor also initiates the preloading by sending the selected one of the processor integrated circuits a cache entry update time control value.

7. The network appliance of claim 1, wherein the network processor also initiates the preloading by sending the selected one of the processor integrated circuits an indication of the predicted future time.

8. The network appliance of claim 1, wherein each of the plurality of processor integrated circuits includes a cache memory that stores cache entries, and wherein the data that is preloaded is a cache entry.

9. The network appliance of claim 1, wherein some packets of the second flow are sent from the network processor to a first of the processor integrated circuits, and wherein others of the packets of the second flow are sent from the network processor to a second of the processor integrated circuits.

10. The network appliance of claim 1, wherein the future packet is the next packet of the flow pair after the packet of the first flow.

11. A method of communicating packets of a flow pair, wherein the flow pair comprises a first flow and a second flow, wherein packets of the first flow pass from a first network device, through a network appliance, and to a second network device, wherein packets of the second flow pass from the second network device, through the network appliance, and to the first network device, the method comprising:
  (a) receiving a packet of the first flow onto a network processor of the network appliance;
  (b) without performing deep packet inspection on any packet of the flow pair determining on the network processor a predicted future time when a future packet of the flow pair will be received onto the network appliance;
  (c) determining on the network processor to send the future packet to a selected one of a plurality of processor integrated circuits based at least in part on the predicted future time;

(d) preloading data associated with a flow to the selected processor, wherein the network processor initiates a preloading of the data prior to the predicted future time when the future packet will be received, and wherein the network processor initiates the preloading by waiting an amount of time and then initiating the preloading;

(e) receiving the future packet onto the network processor; and (f) sending the future packet from the network processor to the selected one of the processor integrated circuits determined in (c), wherein (a) through (f) are performed by the network processor, and wherein the network processor and the plurality of processor integrated circuits are parts of the network appliance.

12. The network appliance of claim 11, wherein the network processor determines the predicted future time in (b) by:

1) detecting a signature of the flow pair, 2) using the signature to identify inter-packet interval prediction information, 3) using the inter-packet interval prediction information and a packet number to determine an inter-packet interval, and 4) using the inter-packet interval to determine when the future packet will be received.

13. The method of claim 11, wherein the network processor determines the predicted future time in (b) without inspecting an application type field in any application layer header of any packet of the flow pair.

14. The method of claim 11, wherein the future packet received in (e) is the next packet of the flow pair after the packet of the first flow received in (a).

15. An apparatus for communicating packets of a flow pair, wherein the flow pair comprises a first flow of packets and a second flow of packets, the apparatus comprising:

a plurality of processing units;

means for receiving a packet of the first flow and without performing deep packet inspection on any packet of the flow pair and for determining a predicted future time when a future packet of the flow pair will likely be received, wherein the means is also for sending the future packet to a selected one of plurality of processing units based at least in part on the predicted future time; and means for preloading data associated with a flow to the selected processor, wherein the apparatus initiates a preloading of the data prior to the predicted future time when the future packet will be received, and wherein the network processor initiates the preloading by waiting an amount of time and then initiating the preloading.

16. The apparatus of claim 15, wherein the apparatus is a network appliance, wherein the means for receiving is a flow processor, and wherein the packets are TCP/IP packets.

17. The apparatus of claim 15, wherein the means for determining the predicted future time includes : 1) monitoring packets of the flow pair and thereby identifying a signature, 2) using the signature to determine an inter-packet interval, and 3) using the inter-packet interval to determine the predicted future time when the future packet will likely be received.

18. The apparatus of claim 15, wherein the means for determining the predicted future time is performed without inspecting an application type field in any application layer header of any packet of the flow pair.

19. The apparatus of claim 15, wherein the first flow and the second flow are parts of a TCP connection, and wherein the TCP connection is not terminated on the apparatus.

* * * * *